(12) United States Patent
Sun et al.

(10) Patent No.: US 12,603,970 B2
(45) Date of Patent: Apr. 14, 2026

(54) METHOD, APPARATUS, ELECTRONIC DEVICE, AND COMPUTER-READABLE MEDIUM FOR DISPLAYING LYRIC EFFECTS

(71) Applicant: BEIJING ZITIAO NETWORK TECHNOLOGY CO., LTD., Beijing (CN)

(72) Inventors: Lei Sun, Beijing (CN); Niwen Zheng, Beijing (CN); Huihui Shang, Beijing (CN); Jia Qu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 17/438,759

(22) PCT Filed: Jul. 1, 2021

(86) PCT No.: PCT/CN2021/104021
§ 371 (c)(1),
(2) Date: Sep. 13, 2021

(87) PCT Pub. No.: WO2022/105245
PCT Pub. Date: May 27, 2022

(65) Prior Publication Data
US 2022/0353456 A1　　Nov. 3, 2022

(30) Foreign Application Priority Data
Nov. 17, 2020　(CN) .......................... 202011287423.8

(51) Int. Cl.
*H04N 5/93*　　　(2006.01)
*G06F 16/64*　　(2019.01)
(Continued)

(52) U.S. Cl.
CPC ........... *H04N 5/9305* (2013.01); *G06F 16/64* (2019.01); *G06F 16/685* (2019.01);
(Continued)

(58) Field of Classification Search
CPC .... H04N 5/9305; H04N 9/8205; G06F 16/64; G06F 16/685; G06F 40/109; G06F 40/103; G06T 3/60; G06T 11/001; G06T 11/60
(Continued)

(56) References Cited

U.S. PATENT DOCUMENTS 5,649,234 A * 7/1997 Klappert ................ G10H 1/368
715/243
5,726,373 A * 3/1998 Choi .................... G11B 27/105
84/610
(Continued)

FOREIGN PATENT DOCUMENTS

CN　　105957544 A　　9/2016
CN　　107943964 A　　4/2018
(Continued)

OTHER PUBLICATIONS

First Office Action issued Jan. 28, 2022 in Chinese Patent Application No. 202011287423.8 (9 pages) with an English translation (8 pages).
(Continued)

*Primary Examiner* — Helen Shibru

(57) ABSTRACT

The present disclosure provides a method, an apparatus, an electronic device, and a computer-readable medium for displaying lyric effects. The method includes: obtaining image data and music data to be displayed; obtaining target lyrics corresponding to the target time point in the lyrics, the target lyrics being displayed in a plurality of colors; staggering the target lyrics displayed in the plurality of colors;
(Continued)

superimposing the staggered target lyrics on a part of the image data corresponding thereto for display, and playing audio data corresponding to the target lyrics.

18 Claims, 4 Drawing Sheets

(51) Int. Cl.
    *G06F 16/683*      (2019.01)
    *G06F 40/109*     (2020.01)
    *G06T 3/60*        (2024.01)
    *G06T 11/00*      (2006.01)
    *G06T 11/60*      (2006.01)

(52) U.S. Cl.
    CPC .............. *G06F 40/109* (2020.01); *G06T 3/60* (2013.01); *G06T 11/001* (2013.01); *G06T 11/60* (2013.01)

(58) Field of Classification Search
    USPC ......................................................... 386/278
    See application file for complete search history.

(56) References Cited

U.S. PATENT DOCUMENTS

| | | | | |
|---|---|---|---|---|
| 6,582,235 | B1 * | 6/2003 | Tsai | G10H 1/38 |
| | | | | 434/307 R |
| 8,304,642 | B1 * | 11/2012 | Bryan | G10H 1/0066 |
| | | | | 84/601 |
| 8,699,853 | B2 * | 4/2014 | Toma | G11B 27/3027 |
| | | | | 386/355 |
| 9,064,484 | B1 * | 6/2015 | Jaaskelainen | G10H 1/361 |
| 10,791,301 | B1 | 9/2020 | Garcia Kilroy et al. | |
| 10,798,271 | B2 | 10/2020 | Parthasarathi et al. | |
| 10,971,123 | B2 * | 4/2021 | Joshi | H04N 21/233 |
| 11,366,854 | B2 * | 6/2022 | Fu | G06F 40/109 |
| 11,688,117 | B2 * | 6/2023 | Sachson | G06T 15/10 |
| | | | | 345/474 |
| 12,061,647 | B2 * | 8/2024 | Zheng | G06F 16/9537 |
| 2007/0166683 | A1 | 7/2007 | Chang et al. | |
| 2008/0053294 | A1 | 3/2008 | Craig et al. | |
| 2017/0212876 | A1 * | 7/2017 | Gou | G06F 40/166 |
| 2018/0047374 | A1 | 2/2018 | Numata et al. | |
| 2018/0374461 | A1 * | 12/2018 | Serletic | H04N 9/8211 |
| 2022/0206292 | A1 * | 6/2022 | DeWall | H04N 9/3194 |
| 2022/0350840 | A1 * | 11/2022 | Zheng | H04N 21/4394 |
| 2022/0351454 | A1 * | 11/2022 | Zheng | G06F 16/64 |
| 2022/0394325 | A1 * | 12/2022 | Zheng | H04N 21/44222 |
| 2024/0362270 | A1 * | 10/2024 | Zheng | G06F 16/38 |

FOREIGN PATENT DOCUMENTS

| | | | |
|---|---|---|---|
| CN | 109495792 | A | 3/2019 |
| CN | 109543064 | A | 3/2019 |
| CN | 111597360 | A | 8/2020 |
| CN | 112380378 | A | 2/2021 |
| CN | 112380379 | A | 2/2021 |
| CN | 112423107 | A | 2/2021 |
| JP | 2013-145393 | A | 7/2013 |
| JP | 2017-156553 | A | 9/2017 |
| JP | 2017-182004 | A | 10/2017 |
| WO | 2015/140396 | A1 | 9/2015 |
| WO | 2019/139301 | A1 | 7/2019 |

OTHER PUBLICATIONS

How to do Douyin text effects? Easily teach you two tricks, use it to bluff! https://www.sohu.com/a/251810089_100027314, Sep. 4, 2018, with an English translation (6 pages).

International Patent Application No. PCT/CN2021/104021, International Search Report mailed Sep. 28, 2021, 5 pages.

Second Office Action issued Apr. 28, 2022 in Chinese Patent Application No. 202011287423.8 (8 pages) with an English translation (11 pages).

Third Office Action issued Jul. 19, 2022 in Chinese Patent Application No. 202011287423.8 (3 pages) with an English translation (4 pages).

European Search Report for EP Patent Application No. 21893397.6, Issued on Feb. 6, 2024, 09 pages.

Office action received from Indian patent application No. 202127041239 mailed on May 2, 2024, 9 pages.

Office action received from Indonesia patent application No. 202127041239 mailed on Sep. 27, 2024, 6 pages (3 pages English Translation and 3 pages Original Copy).

Feng Rui et al.; The Constrution of Learning Social Networking Sites in the Perspective Connectionism; Journal of Distance Education; Issue 3; Apr. 2013; p. 10-16 (English Abstract on p. 16).

Written Opinion for International Application No. PCT/CN2021/104021, mailed Sep. 28, 2021, 8 Pages.

\* cited by examiner

Obtaining image data and music data to be displayed, the music data comprising audio data and lyrics — S101

Determining a target time point, and obtaining target lyrics corresponding to the target time point in the lyrics, the target lyrics being displayed in a plurality of colors — S102

Staggering the target lyrics displayed in the plurality of colors — S103

Superimposing the staggered target lyrics on a part of the image data corresponding thereto for display, and playing audio data corresponding to the target lyrics — S104

FIG. 1

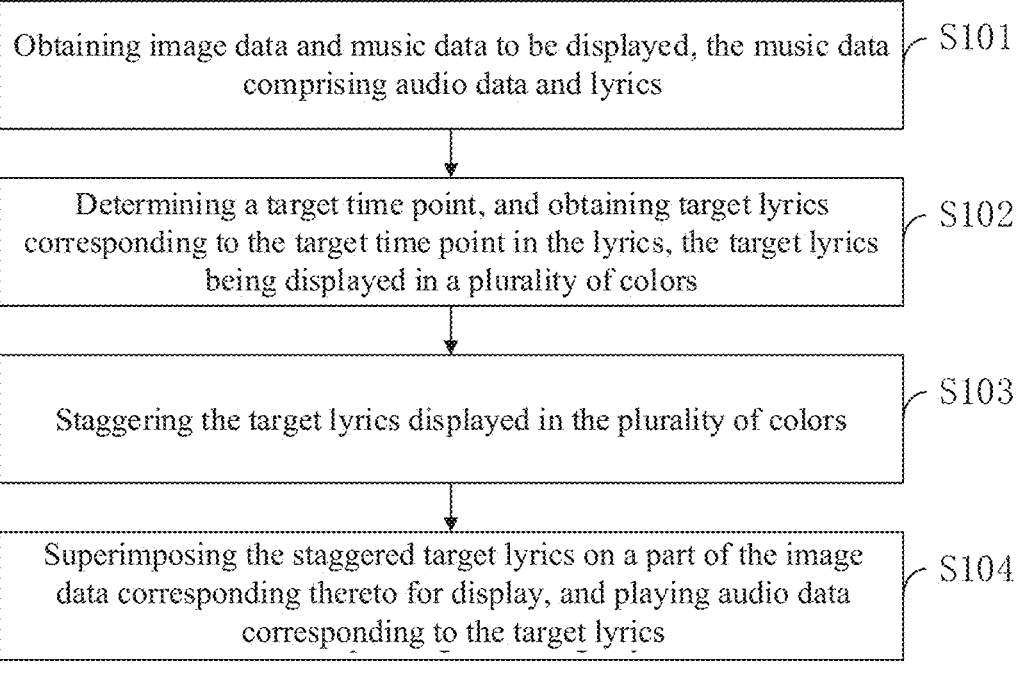

FIG. 2

Apparatus for
displaying lyric effects

Data obtaining module ⌐ 710

Lyric determination
module ⌐ 720

Staggering module ⌐ 730

Lyric display module ⌐ 740

⌐ 70

Processing unit

ROM

RAM

800

801

802

803

804

805

I/O interface 806      807      808      809

Input unit    Output unit    Storage unit    Communication
unit

METHOD, APPARATUS, ELECTRONIC DEVICE, AND COMPUTER-READABLE MEDIUM FOR DISPLAYING LYRIC EFFECTS

The present application is a U.S. 371 Application of International Patent Application No. PCT/CN2021/104021, filed on 1 Jul. 2021, which application claims priority to Chinese patent application No. 202011287423.8, titled "METHOD, APPARATUS, ELECTRONIC DEVICE, AND COMPUTER-READABLE MEDIUM FOR DISPLAYING LYRIC EFFECTS", filed on Nov. 17, 2020 by Beijing Zitiao Network Technology Co., Ltd., the entire contents of which are incorporated herein by reference.

FIELD

The present disclosure relates to the technical field of video processing, and specifically, to a method, an apparatus, an electronic device, and a computer-readable medium for displaying a lyric video.

BACKGROUND

With the development of video technology, people's requirements for music videos are getting higher and higher. The presence of music lyrics in music videos is already a very common feature.

In the existing music videos, the lyrics will scroll or translate at the bottom of the video when playing the music. Some technologies also have the function of coloring the lyrics, but these are simply superimposing the lyrics with the video. The entry and exit of the lyrics are some basic effects, and for the lyric videos with a background, the lyrics are completely separated from the background, and have no correlation, resulting in poor experience for users to watch the lyric video, and because the lyrics have just some simple mechanical basic effects and the form of presentation of the lyrics is relatively single, resulting in poor user experience.

SUMMARY

Technical Problem

A purpose of the present disclosure is intended to at least solve one of the above technical defects, especially the technical problems of a simple superposition of lyrics and videos in the related art, the entry and exit of lyrics being some basic effects, and poor user experience.

Technical Solution

In a first aspect, a method for displaying lyric effects is provided, the method including obtaining image data and music data to be displayed, the music data including audio data and lyrics; determining a target time point, and obtaining target lyrics corresponding to the target time point in the lyrics, the target lyrics being displayed in a plurality of colors; staggering the target lyrics displayed in the plurality of colors; superimposing the staggered target lyrics on a part of the image data corresponding thereto for display, and playing audio data corresponding to the target lyrics.

In a second aspect, an apparatus for displaying lyric effects is provided, the apparatus including: a data obtaining module, configured to obtain image data and music data to be displayed, the music data including audio data and lyrics; a lyric determination module, configured to determine a target time point, and obtain target lyrics corresponding to the target time point in the lyrics, the target lyrics being displayed in a plurality of colors; a staggering module, configured to stagger the target lyrics displayed in the plurality of colors; and a lyric display module, configured to superimpose the staggered target lyrics on a part of the image data corresponding thereto, for display, and play audio data corresponding to the target lyrics.

In a third aspect, an electronic device is provided, the device including: one or more processors; a memory; and one or more application programs stored in the memory and configured to be executed by the one or more processors to execute the above method for displaying lyric effects.

In a fourth aspect, a computer-readable medium is provided, the computer-readable medium having at least one instruction, at least one segment program, a code set, or an instruction set stored thereon. The at least one instruction, the at least one segment program, the code set, or the instruction set is configured to be loaded and executed by a processor to implement the above method for displaying lyric effects.

Advantageous Effects

The embodiments of the present disclosure obtain music lyrics, split color channels of the music lyrics to obtain music lyrics of a plurality of color channels, and stagger the music lyrics of the plurality of color channels for display, so that the music lyrics will present cool and colorful display effects, giving users a stronger visual impact and better user experience.

BRIEF DESCRIPTION OF DRAWINGS

In order to more clearly illustrate the technical solutions in the embodiments of the present disclosure, the drawings needed to be used in the description of the embodiments of the present disclosure are briefly introduced below.

FIG. 1 is a schematic flowchart of a method for displaying lyric effects provided by an embodiment of the present disclosure;

FIG. 2 is a schematic diagram of lyrics provided by an embodiment of the present disclosure;

Figure 3:
FIG. 3 is a schematic diagram of separation of lyrics provided by an embodiment of the present disclosure.

With reference to the accompanying drawings and the following specific implementations, the above and other features, advantages, and aspects of the embodiments of the present disclosure will become more apparent. Throughout the accompanying drawings, the same or similar reference numerals indicate the same or similar elements. It should be understood that the accompanying drawings are schematic and the components and elements are not necessarily drawn to scale.

DESCRIPTION OF EMBODIMENTS

Hereinafter, embodiments of the present disclosure will be described in more detail with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the protection scope of the present disclosure.

It should be understood that the steps described in method implementations of the present disclosure may be executed in a different order, and/or executed in parallel. In addition, the method implementations may include additional steps and/or omit to perform the illustrated steps. The scope of the present disclosure is not limited in this respect.

The term "including" and its variants as used herein are open-ended including, that is, "including but not limited to"; the term "based on" is "at least in part based on"; the term "one embodiment" means "at least one embodiment"; the term "another embodiment" means "at least one additional embodiment"; the term "some embodiments" means "at least some embodiments". Related definitions of other terms will be given in the following description.

It should be noted that the concepts "first", "second" and the like mentioned in the present disclosure are only used to distinguish apparatuses, modules, or units, and are not used to limit these apparatuses, modules, or units to be different apparatuses, modules or units, and are not used to limit the order or interdependence of the functions performed by these apparatuses, modules, or units.

It should be noted that the modification with "a" or "a plurality of" mentioned in the present disclosure is illustrative and not restrictive. Those skilled in the art should understand that unless the context clearly indicates otherwise, it should be understood as "one or more".

The names of messages or information exchanged between a plurality of apparatuses in the implementations of the present disclosure are only used for illustrative purposes, and are not used to limit the scope of these messages or information.

The method, apparatus, electronic device, and computer-readable medium for displaying lyric effects provided by the present disclosure are intended to solve the above technical problems in the related art.

The technical solutions of the present disclosure and how the technical solutions of the present disclosure solve the above technical problems will be described in detail below with specific embodiments. The following specific embodiments can be combined with each other, and the same or similar concepts or processes may not be repeated in some embodiments. The embodiments of the present disclosure will be described below in conjunction with the accompanying drawings.

An embodiment of the present disclosure provides a method for displaying lyric effects, which is applied to a user terminal and can be a function of a certain application (APP) in the user terminal, or a function of a certain module in the APP. The application terminal is equipped with an image data display apparatus and an audio data playing apparatus. As illustrated in FIG. 1, the method includes: step S101, obtaining image data and music data to be displayed, the music data including audio data and lyrics; step S102, determining a target time point, and obtaining target lyrics corresponding to the target time point in the lyrics, the target lyrics being displayed in a plurality of colors; step S103, staggering the target lyrics displayed in the plurality of colors; and step S104, superimposing the staggered target lyrics on a part of the image data corresponding thereto for display, and playing audio data corresponding to the target lyrics.

In the embodiment of the present disclosure, the image data refers to image data that needs to be displayed on a user terminal, and are a sequence of frames of images, such as video data. The music data is music containing lyrics, where the lyrics may be Chinese lyrics or lyrics in other languages.

In the embodiment of the present disclosure, the target time point is a relative time point, which is a time point relative to a starting point to playing the music data, and is also a time point relative to a starting point to play the image data.

In the embodiment of this disclosure, the image data and music data to be processed are obtained based on a lyric effects display operation of a user, the image data and the music data being data stored locally, or data downloaded from the Internet, or data recorded by the user; and a target time point is obtained, where the target time point may be a time point to play the image data or the music data, or a certain time point in the image data or the music data selected by the user, for the user to preview the lyric effects at that time point. Based on the target time point, lyrics corresponding to the target time point in the music data are obtained, the lyrics being lyrics containing a plurality of colors. Then, lyrics of three colors corresponding to the sentence of lyrics are staggered, and the staggered lyrics of the three colors are superimposed on a part of the image data corresponding thereto for display.

Figure 4:
FIG. 4 is a schematic diagram of staggering of lyrics provided by an embodiment of the present disclosure.

For the embodiment of this disclosure, for the convenience of description, a specific embodiment is taken as an example. The method includes: obtain image data and music data to be displayed based on a lyric effects display operation of a user, the image data being a video and the music data being a music with lyrics; determining a target time point, optionally, the target time point being a playback time point of a first sentence of lyrics in the music; obtaining lyrics corresponding to the target time point in the music data, i.e., obtaining a first sentence of lyrics in the music, as illustrated in FIG. 2, the sentence of lyrics being black "LYRIC EFFECTS"; performing color separation on the lyrics in accordance with preset color channels, optionally, as illustrated in FIG. 3, using RGB color channels, separating the lyrics into lyrics of R channel, lyrics of G channel, and lyrics of B channel; and staggering the separated lyrics of the R channel, G channel, and B channel, where the staggering indicates that one of the channels, such as the G channel is a reference, the lyrics of the other two channels are displaced relatively by certain distances, the relative displacement by the certain distances should ensure that a displacement amount between the lyrics of the three channels will not be too large, e.g., forming the staggered lyrics as illustrated in FIG. 4; and superimposing the staggered lyrics on a part of the image data corresponding thereto for display, and playing music data corresponding thereto at the same time.

The embodiment of the present disclosure obtains music lyrics and splits the colors of the music lyrics to obtain music lyrics of a plurality of color channels, and staggers the music lyrics of the plurality of color channels for display, so that the music lyrics will present cool and colorful display effects, giving users a stronger visual impact and better user experience.

In some embodiments, the target lyrics being displayed in a plurality of colors includes: the target lyrics being separated into target lyrics of the plurality of colors in accordance with preset color channels for display.

In an embodiment of the present disclosure, the method includes performing color separation on the lyrics based on preset color channels. Optionally, the color channels may be a plurality of color channels in the RGB color mode. For example, a sentence of lyrics in black f Mont can be divided into lyrics of three color channels: lyrics of R (red) color channel, lyrics of G (green) color channel, and lyrics of B (blue) color channel. Optionally, color separation can be performed on the lyrics based on other color channels.

In some embodiments, the method further includes, prior to said obtaining the target lyrics corresponding to the target time point in the lyrics: composing the target lyrics. Said staggering the target lyrics in the plurality of colors includes: staggering the composed target lyrics.

In the embodiments of the present disclosure, composing refers to adjusting the display position, display size, etc. of the lyrics. Before the color separation is performed on the lyrics, the lyrics may be composed.

In some embodiments, said composing the target lyrics includes: adjusting a number of words displayed in each line of the target lyrics based on a lyric length and a number of sentences of the target lyrics, and adjusting a size of a display font of the target lyrics based on a size of a display interface.

Figure 5:
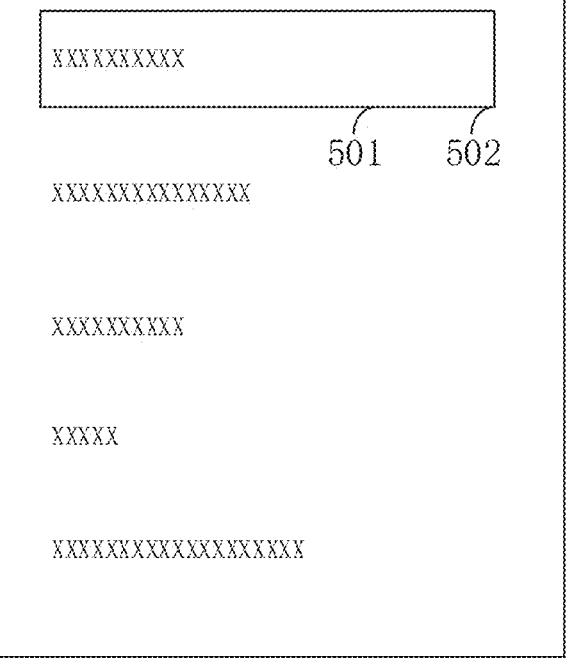
FIG. 5 is a schematic diagram of composing of lyrics provided by an embodiment of the present disclosure.

For the embodiment of this disclosure, for convenience of description, a specific embodiment is taken as an example. For lyrics of a song, the method may include, when composing the lyrics: adjusting a number of words displayed in each line of lyrics based on a lyric length and a number of lyric sentences of the song, and adjusting a size of a display font of the lyrics based on a size of a display interface. As illustrated in FIG. 5, for the composed lyrics, the method includes, based on the target time point, determining a line of lyrics corresponding to the target time point, and determining the four boundary points of the line of lyrics. As illustrated in FIG. 5, determining four boundary points 502 of the lyrics 501, intercepting the line of lyrics, and on the basis of the composed line of lyrics, performing color separation on the lyrics and then staggering the lyrics.

In the embodiment of the present disclosure, by composing the lyrics and adjusting display mode of the lyrics, the lyrics are more regular when displayed.

In some embodiments, said staggering the target lyrics includes: for one sentence of lyrics within the target lyrics, determining one color channel of the sentence of lyrics as a reference, and moving other color channels of the sentence of lyrics by moving distances that are sinusoidally distributed.

In the embodiment of the present disclosure, for one sentence of lyrics, after separating the sentence of lyrics into lyrics of a plurality of color channels based on the color channels of the sentence of lyrics, said determining one of the color channels as a reference and moving the other channels require to control moving distances, in order to ensure that the distance between the lyrics of one color channel and the lyrics of another color channel is kept in a desirable range, so that the color channels have a lyric overlap there between, but the distance is not too large. Optionally, for all sentences of lyrics, distances between different color-difference channels in each sentence of lyrics satisfies a sinusoidal distribution.

For the embodiments of this disclosure, for convenience of description, a specific embodiment is taken as an example. For a sentence of lyrics, the color separation of RGB channels is performed to form lyrics of R channel, lyrics of G channel, and lyrics of B channel. Optionally, G channel is used as the reference, the lyrics of the R channel and the lyrics of the B channel are moved. Optionally, the moving distances can be values randomly selected on a sinusoidal function to achieve the randomness of the moving distances, and that the moving distances will not be too large so that the color channels have lyrics superimposed on each other.

In the embodiment of the present disclosure, by controlling the movement distances of the lyrics of the color channels into a sinusoidal distribution, the randomness of the movement distances is achieved, and the movement distances are not too large, so that the various color channels have lyrics superimposed on each other to present a cool visual effect.

Figure 6:
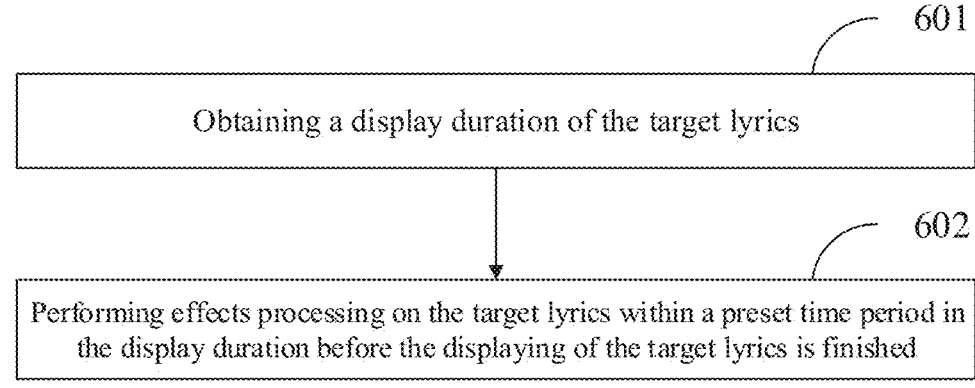
FIG. 6 is a schematic flowchart of a method for adding lyric effects provided by an embodiment of the present disclosure.

In some embodiments, as illustrated in FIG. 6, the method further includes: step S601, obtaining a display duration of the target lyrics; and step S602, performing effects processing on the target lyrics within a preset time period in the display duration before the displaying of the target lyrics is finished.

In the embodiment of the present disclosure, when displaying lyrics, special effects can be added on the switching between different lyrics, and optionally, exit effects can be added on the lyrics that are displayed first.

In some embodiments, said performing effects processing on the target lyrics includes: obtaining preset exit effects and a play duration of the exit effects when the display duration of the currently displayed target lyrics reaches a preset duration; and playing the exit effects in accordance with the preset exit effects and the play duration of the exit effects, wherein the playing of the exit effects is controlled to be finished when the displaying of the currently displayed target lyrics is finished.

For the embodiment of this disclosure, for convenience of description, a specific embodiment is taken as an example. For a sentence of lyrics, the display duration of the sentence of lyrics is obtained. Optionally, the display duration is 10 seconds, Exit effects of the sentence of lyrics and a play duration of the exit effects are obtained. Optionally, the exit effects can be preset. Based on the play duration of the exit effects (for example, 2 seconds), the exit effects starts to be played when time having lapsed since the display of the lyrics started reaches 8 seconds (preset duration), so that when the playing of the exit effects is finished, the displaying of the lyrics is finished, and a next sentence of lyrics starts to be displayed, thereby completing the display connection between the lyrics.

In the embodiment of the present disclosure, by adding special effects to the connection time between two sentences of lyrics, the display of the lyrics is cooler.

In some embodiments, said performing effects processing on the target lyrics includes: rotating the target lyrics about a preset rotation axis.

In some embodiments, said rotating the target lyrics about the preset rotation axis includes: rotating the target lyrics by a preset angle about the preset rotation axis.

In the embodiment of the present disclosure, when adding effects processing on the lyrics, optionally, the effects are rotating the sentence of lyrics, and optionally, rotating the sentence of lyrics with a selected rotation axis and a selected rotation angle.

In some embodiments, the method further includes, when rotating the target lyrics about the preset rotation axis: adding translational effects to the target lyrics to control the target lyrics to move out of a display interface when the target lyrics are rotated about the preset rotation axis.

For example, when rotating the sentence of lyrics, translational effects can be added to the sentence of lyrics, so that the sentence of lyrics moves out of the display interface while being rotated.

In the embodiment of the present disclosure, by adding rotating effects to the lyrics, and adding rotating exit effects when the displaying of the lyrics is finished, the visual effect of the display of the lyrics is better.

In some embodiments, said staggering the target lyrics displayed in the plurality of colors includes: staggering the target lyrics displayed in the plurality of colors for a plurality of times to form a plurality of sets of staggered target lyrics of the plurality of different colors; and said superimposing the staggered target lyrics on the part of the image data corresponding thereto for display includes: sequentially superimposing the plurality of sets of staggered target lyrics of the plurality of different colors on the part of the image data corresponding thereto for display.

In the embodiment of the present disclosure, for a sentence of lyrics, after color separation is performed on the sentence of lyrics, when staggering the lyrics of the various color channels, staggering for a plurality of times can be selected to obtain a plurality of staggering results, and the plurality of staggering results is displayed in one time to achieve the effects of shift, jitter, and superposition of the lyrics.

For the embodiments of this disclosure, for convenience of description, a specific embodiment is taken as an example. For a sentence of lyrics, the color separation of RGB channels is performed to form the lyrics of R channel, the lyrics of G channel, and the lyrics of B channel respectively. Optionally, the G channel is used as the reference, the lyrics of the R channel and the lyrics of the B channel are moved. Optionally, moving distances can be randomly selected on the sinusoidal function. Optionally, the lyrics of the R channel and the lyrics of the B channel are moved according to distances selected for a first time, to obtain the results of one-time movements, and to form a first lyric image superimposed with color lyrics. Then, moving distances are selected for a second time on the sinusoidal function, and the lyrics of the R channel and the lyrics of the B channel are moved according to the distances selected for the second time, to obtain the results of second-time movements, and to form a second lyric image superimposed by color lyrics. Optionally, third-time and fourth-time movements can be carried out to form a plurality of lyric images. When displaying the sentence of lyrics, the plurality of lyric images can be sequentially superimposed on a target image corresponding thereto for display, so as to achieve the effects of shift, jitter, and superposition of the lyrics.

In the embodiment of the present disclosure, by staggering the lyrics of the plurality of channels after color separation for a plurality of times, a plurality of sets of staggered color lyrics is obtained, and the plurality of sets of staggered color lyrics is then displayed in one time to achieve the effects of shift, jitter, and superposition of the lyrics, providing cooler display of the lyrics.

In some embodiments, the method further includes: synthesizing the processed image data and the music data into a video in response to a video generation operation of a user.

In the embodiment of the present disclosure, the processed image data and music data may be synthesized into a music video in response to the video generation operation of the user, where the video generation operation of the user may be a touch operation of the user based on the display interface, or may be an operation of the user when selecting the image data and the music data to be processed. The user can select to generate a video when selecting the image data and the music data to be processed, and thus after the processing of the image data is completed, the video will be automatically generated.

In the embodiments of the present disclosure, the user can select to generate a video, which is convenient for the user to perform operations such as sharing the video.

The embodiments of the present disclosure obtain the music lyrics, split the colors of the music lyrics to obtain music lyrics of a plurality of color channels, and stagger the music lyrics of the plurality of color channels for display. The music lyrics will present cool and colorful display effects, giving users a stronger visual impact and better user experience.

Figure 7:
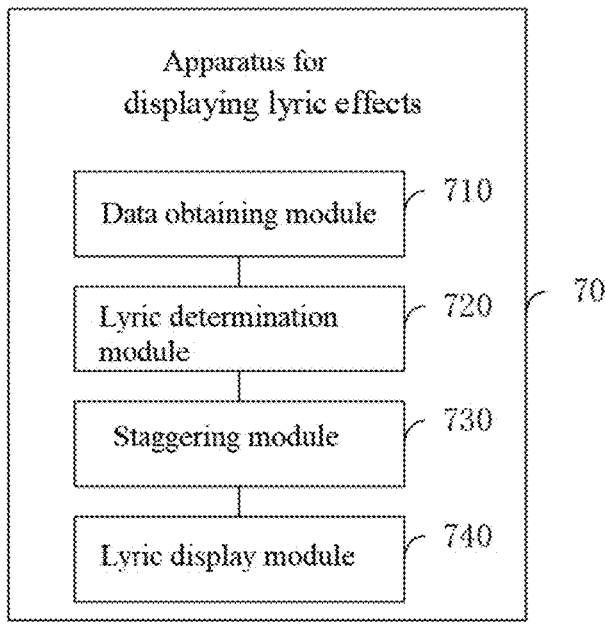
FIG. 7 is a structural schematic diagram of an apparatus for displaying lyrics provided by an embodiment of the present disclosure.

An embodiment of the present disclosure provides an apparatus for displaying lyric effects. As illustrated in FIG. 7, the apparatus 70 for displaying lyric effects may include: a data obtaining module 710, a lyric determination module 720, a staggering module 730, and a lyric display module 740.

The data obtaining module 710 is configured to obtain image data and music data to be displayed, the music data including audio data and lyrics.

The lyric determination module 720 is configured to determine a target time point, and obtain target lyrics corresponding to the target time point in the lyrics, the target lyrics being displayed in a plurality of colors.

The staggering module 730 is configured to stagger the target lyrics displayed in the plurality of colors.

The lyric display module 740 is configured to superimpose the staggered target lyrics on a part of the image data corresponding thereto, for display, and play audio data corresponding to the target lyrics.

In some embodiments, the lyric determination module 720 may be configured to, when displaying the target lyrics in the plurality of colors, separate the target lyrics into target lyrics of a plurality of colors for display according to preset color channels.

In some embodiments, the lyric determination module 720 may be configured to, prior to obtaining the target lyrics corresponding to the target time point in the lyrics, compose the target lyrics; and the staggering module 730 may be configured to, when staggering the target lyrics displayed in the plurality of colors, stagger the composed target lyrics.

In some embodiments, the staggering module 730 may be configured to, when composing the target lyrics: adjust a number of words displayed in each line of the target lyrics based on a lyric length and a number of sentences of the target lyrics, and adjust a size of a display font of the target lyrics based on a size of a display interface.

In some embodiments, the staggering module 730 may be configured to, when staggering the target lyrics: for one sentence of lyrics within the target lyrics, determine one color channel of the sentence of lyrics as a reference, and move other color channels of the sentence of lyrics by moving distances that are sinusoidally distributed.

In some embodiments, the apparatus for displaying lyric effects further includes a lyric effects processing module configured to obtain a display duration of the target lyrics, and perform effects processing on the target lyrics within a preset time period in the display duration before the displaying of the target lyrics is finished.

In some embodiments, the lyric effects processing module may be configured to, when performing effects processing on the target lyrics: obtain preset exit effects and a play duration of the exit effects when the display duration of the currently displayed target lyrics reaches a preset duration; and play the exit effects in accordance with the preset exit effects and the play duration of the exit effects, wherein the playing of the exit effects is controlled to be finished when the displaying of the currently displayed target lyrics is finished.

In some embodiments, the lyric effects processing module may be configured to, when performing effects processing on the target lyrics, rotate the target lyrics about a preset rotation axis.

In some embodiments, the lyric effects processing module may be configured to, when rotating the target lyric about the preset rotation axis, rotate the target lyrics by a preset angle about the preset rotation axis.

In some embodiments, the lyric effects processing module may be further configured to, when rotating the target lyric about the preset rotation axis, add translational effects to the target lyrics to control the target lyrics to move out of a display interface when the target lyric is rotated about the preset rotation axis.

In some embodiments, the staggering module 730 may be configured to, when staggering the target lyrics displayed in the plurality of colors, stagger the target lyrics displayed in the plurality of colors for a plurality of times to form a plurality of sets of staggered target lyrics of a plurality of different colors; and the display module 760 may be configured to, when superimposing the staggered target lyrics on the part of the image data corresponding thereto for display, sequentially superimpose the plurality of sets of staggered target lyrics of the plurality of different colors on the part of the image data corresponding thereto for display.

In some embodiments, the lyric effects display module further includes a video generation module configured to synthesize the processed image data and the music data into a video in response to a video generation operation of a user.

The embodiments of the present disclosure obtain music lyrics, split the colors of the music lyrics to obtain music lyrics of a plurality of color channels, and stagger the music lyrics of the plurality of color channels for display, and thus the music lyrics will present cool and colorful display effects, giving users a stronger visual impact and better user experience.

Figure 8:
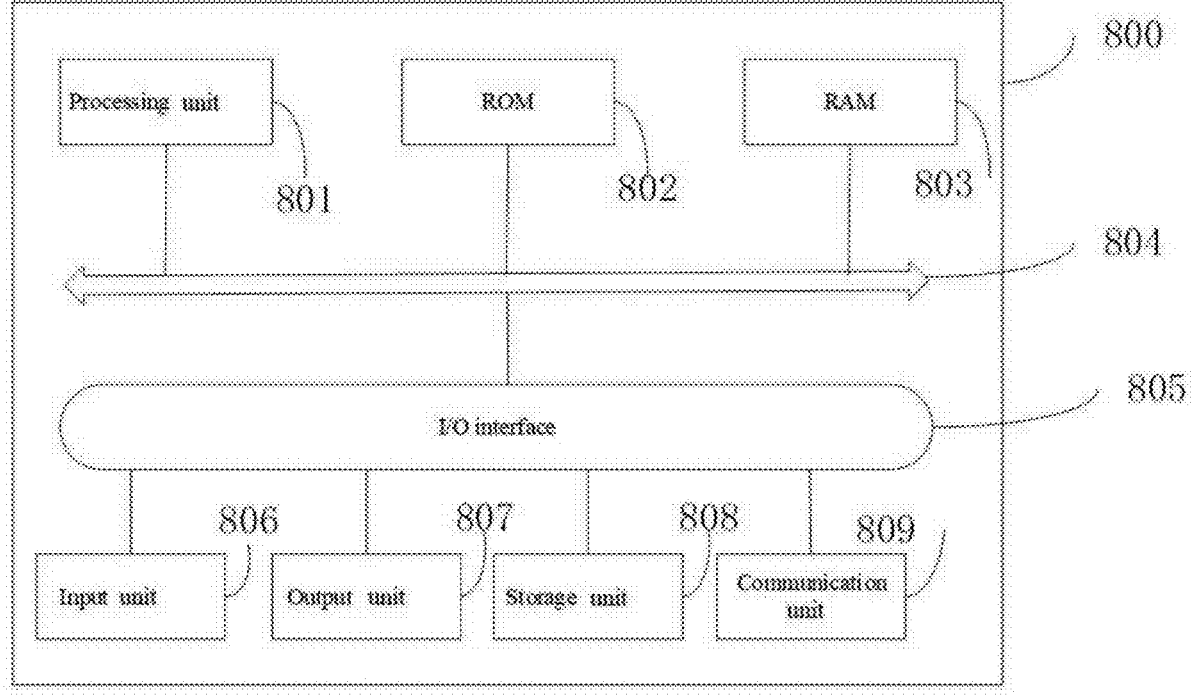
FIG. 8 is a structural schematic diagram of an electronic device provided by an embodiment of the present disclosure.

Reference is now made to FIG. 8, which is a structural schematic diagram showing an electronic device 800 adapted to implement the embodiments of the present disclosure. The terminal devices according to the embodiments of the present disclosure may include, but are not limited to, mobile terminals such as a mobile phone, a laptop computer, a digital broadcast receiver, a Personal Digital Assistant (PDA), a tablet computer (PAD), a Portable Multimedia Player (PMP), and an in-vehicle terminal (e.g., an in-vehicle navigation terminal), and fixed terminals such as a digital TV, a desktop computer, etc. The electronic device illustrated in FIG. 8 is exemplary only, and should not be construed as limiting the function and scope of use of the embodiments of the present disclosure.

The electronic device includes a memory and a processor. The processor here may be referred to as a processing unit 801 below, and the memory may include at least one of a read-only memory (ROM) 802, a random access memory (RAM) 803, and a storage unit 808 below, as illustrated in detail below.

As illustrated in FIG. 8, the electronic device 800 may include a processing device (such as a central processing unit, a graphics processing unit, etc.) 801, which may perform various appropriate actions and processes in accordance with programs stored in a Read Only Memory (ROM) 802 or loaded from a storage unit 808 into a Random Access Memory (RAM) 803. In the RAM 803, various programs and data required for the operation of the electronic device 800 may also be stored. The processing unit 801, the ROM 802, and the RAM 803 are connected to each other through a bus 804. An input/output (I/O) interface 805 is also connected to the bus 804.

Generally, the following apparatuses may be connected to the I/O interface 805: an input unit 806 including, for example, a touch screen, a touch pad, a keyboard, a mouse, a camera, a microphone, an accelerometer, a gyroscope, etc.; an output unit 807 including, for example, a Liquid Crystal Display (LCD), a speaker, an oscillator, etc.; a storage unit 808 including, for example, a magnetic tape or a hard disk, etc.; and a communication unit 809. The communication unit 809 may allow the electronic device 800 to perform wireless or wired communication with oilier devices for data exchange. Although FIG. 8 illustrates the electronic device 800 having various units, it can be appreciated that it is not necessary to implement or provide all the illustrated units. Alternatively, more or fewer units may be implemented or provided.

In particular, according to the embodiment of the present disclosure, the processes described above with reference to the flowcharts may be implemented as computer software programs. For example, an embodiment of the present disclosure includes a computer program product, which includes a computer program carried on a non-transitory computer-readable medium. The computer program includes program codes for implementing the method illustrated in any of the flowcharts. In these embodiments, the computer program may be downloaded and installed from a network through the communication unit 809, or installed from the storage unit 808, or installed from the ROM 802. When the computer program is executed by the processing unit 801, the above functions defined in the methods according to the embodiments of the present disclosure are performed.

It is to be noted that the above computer-readable medium in the present disclosure may be a computer-readable signal medium or a computer-readable medium or any combination thereof. The computer-readable medium may be, but not limited to an electrical, magnetic, optical, electromagnetic, infrared, or semiconductor system, apparatus, or device, or any combination thereof. More specific examples of the computer-readable medium may include, but not limited to: an electrical connection having one or more wires, a portable computer disk, a hard disk, a Random Access Memory (RAM), a Read Only Memory (ROM), an Erasable Programmable Read Only. Memory (EPROM) or a flash memory, an optical fiber, a Compact Disc Read-Only Memory (CD-ROM), an optical memory device, a magnetic memory device, or any suitable combination thereof. In the present disclosure, the computer-readable medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may also be any computer-readable medium other than the computer-readable medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), etc., or any suitable combination thereof.

In some embodiments, the clients and servers can communicate by using any currently known or future-developed network protocol such as HTTP (HyperText Transfer Protocol), and can be interconnected with any form or medium of digital data communication (for example, communication network). Examples of communication networks include local area networks ("LAN"), wide area networks ("WAN"), the Internet (for example, the Internet), and end-to-end networks (for example, ad hoc end-to-end networks), as well as any networks currently known or developed in the future.

The above computer-readable medium may be included in the above electronic device; or may be present separately without being assembled into the electronic device.

The above computer-readable medium carry one or more programs which, when executed by the electronic device, cause the electronic device to: obtain image data and music data to be displayed, the music data including audio data and lyrics; determine a target time point, and obtain target lyrics corresponding to the target time point in the lyrics, the target lyrics being displayed in a plurality of colors; stagger the target lyrics displayed in the plurality of colors; superimpose the staggered target lyrics on a part of the image data corresponding thereto for display, and play audio data corresponding to the target lyrics.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the drawings illustrate the possible implementations of the system architecture, functions, and operations of the system, method, and computer program product according to various embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the block may also occur in a different order from the order marked in the drawings. For example, two blocks illustrated in succession can actually be executed substantially in parallel, and they can sometimes be executed in a reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations or can be implemented by a combination of dedicated hardware and computer instructions.

The modules or units involved in the embodiments described in the present disclosure can be implemented in software or hardware. Wherein, the name of the module or the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium including or storing programs, which may be used by or used with an instruction execution system, apparatus, or device. The machine-readable medium may be a machine-readable signal medium or a machine-readable storage medium. The machine-readable medium may include, but not limited to an electrical, magnetic, optical, electromagnetic, infrared, or semiconductor system, apparatus, or device, or any suitable combination thereof, More specific examples of the machine-readable storage media may include an electrical connection based on one or more wires, a portable computer disk, a hard disk, a Random Access Memory (RAM), a Read Only Memory (ROM), an Erasable Programmable Read Only Memory (EPROM or a flash memory), an optical fiber, a portable Compact Disc Read-Only Memory (CD-ROM), an optical memory device, a magnetic memory device, or any suitable combination thereof.

According to one or more embodiments provided in the present disclosure, a method for displaying lyric effects is provided, the method including: obtaining image data and music data to be displayed, the music data including audio data and lyrics; determining a target time point, and obtaining target lyrics corresponding to the target time point in the lyrics, the target lyrics being displayed in a plurality of colors; staggering the target lyrics displayed in the plurality of colors; and superimposing the staggered target lyrics on a part of the image data corresponding thereto for display, and playing audio data corresponding to the target lyrics.

In some embodiments, the target lyrics being displayed in the plurality of colors includes: the target lyrics being separated into target lyrics of the plurality of colors in accordance with preset color channels for display.

In some embodiments, the method further includes, prior to said obtaining the target lyrics corresponding to the target time point: composing the target lyrics, and said staggering the target lyrics displayed in the plurality of colors includes: staggering the composed target lyrics.

In some embodiments, said composing the target lyrics includes: adjusting a number of words displayed in each line of the target lyrics based on a lyric length and a number of sentences of the target lyrics, and adjusting a size of a display font of the target lyrics based on a size of a display interface.

In some embodiments, said staggering the target lyrics includes: for one sentence of lyrics within the target lyrics, determining one color channel of the sentence of lyrics as a reference, and moving other color channels of the sentence of lyrics by moving distances that are sinusoidally distributed.

In some embodiments, the method further includes: obtaining a display duration of the target lyrics; and performing effects processing on the target lyrics within a preset time period in the display duration before the displaying of the target lyrics is finished.

In some embodiments, said performing effects processing on the target lyrics includes: obtaining preset exit effects and a play duration of the exit effects when the display duration of the currently displayed target lyrics reaches a preset duration; and playing the exit effects in accordance with the preset exit effects and the play duration of the exit effects, wherein the playing of the exit effects is controlled to be finished when the displaying of the currently displayed target lyrics is finished.

In some embodiments, said performing effects processing on the target lyrics includes: rotating the target lyrics about a preset rotation axis.

In some embodiments, said rotating the target lyrics about the preset rotation axis includes: rotating the target lyrics by a preset angle about the preset rotation axis.

In some embodiments, the method further includes, when rotating the target lyrics about the preset rotation axis: adding translational effects to the target lyrics to control the target lyrics to move out of a display interface when the target lyric is rotated about the preset rotation axis.

In some embodiments, said staggering the target lyrics displayed in the plurality of colors includes: staggering the target lyrics displayed in the plurality of colors for a plurality of times to form a plurality of sets of staggered target lyrics of the plurality of different colors; and said superimposing the staggered target lyrics on the part of the image data corresponding thereto for display includes: sequentially superimposing the plurality of sets of staggered target lyrics of the plurality of different colors on the part of the image data corresponding thereto for display.

In some embodiments, the method further includes: synthesizing, in response to a video generation operation of a user, the image data having the target lyrics superimposed thereon and the music data into a video.

According to one or more embodiments provided in the present disclosure, an apparatus for displaying lyric effects is provided, the apparatus including: a data obtaining module configured to obtain image data and music data to be displayed, the music data including audio data and lyrics; a lyric determination module configured to determine a target time point, and obtain target lyrics corresponding to the target time point in the lyrics, the target lyrics being displayed in a plurality of colors; a staggering module configured to stagger the target lyrics displayed in the plurality of colors; and a lyric display module configured to superimpose the staggered target lyrics on a part of the image data corresponding thereto, for display, and play audio data corresponding to the target lyrics.

In some embodiments, the lyric determination module displays may be configured to, when displaying the target lyrics in the plurality of colors, separate the target lyrics into target lyrics of a plurality of colors for display according to preset color channels.

In some embodiments, the staggering module may be configured to compose the target lyrics before the target lyrics corresponding to the target time point in the lyrics are obtained.

In some embodiments, the staggering module may be configured to, when staggering the target lyrics displayed in the plurality of colors, stagger the composed target lyrics.

In some embodiments, the staggering module may be configured to, when composing the target lyrics, adjust a number of words displayed in each line of the target lyrics based on a lyric length and a number of sentences of the target lyrics, and adjust a size of a display font of the target lyrics based on a size of a display interface.

In some embodiments, the staggering module may be configured to, when staggering the target lyrics: for one sentence of lyrics within the target lyrics, determine one color channel of the sentence of lyrics as a reference, and move other color channels of the sentence of lyrics by moving distances that are sinusoidally distributed.

In some embodiments, the apparatus for displaying lyric effects further includes a lyric effects processing module configured to obtain a display duration of the target lyrics, and perform effects processing on the target lyrics within a preset time period in the display duration before the displaying of the target lyrics is finished.

In some embodiments, the lyric effects processing module may be configured to, when performing effects processing on the target lyrics, obtain preset exit effects and a play duration of the exit effects when the display duration of the currently displayed target lyrics reaches a preset duration, and play the exit effects in accordance with the preset exit effects and the play duration of the exit effects, wherein the playing of the exit effects is controlled to be finished when the displaying of the currently displayed target lyrics is finished.

In some embodiments, the lyric effects processing module may be configured to, when performing effects processing on the target lyrics, rotate the target lyrics about a preset rotation axis.

In some embodiments, the lyric effects processing module may be configured to, when rotating the target lyric about the preset rotation axis, rotate the target lyrics by a preset angle about the preset rotation axis.

In some embodiments, the lyric effects processing module may be configured to, when rotating the target lyrics about the preset rotation axis, add translational effects to the target lyrics to control the target lyrics to move out of a display interface when the target lyrics are rotated about the preset rotation axis.

In some embodiments, the staggering module may be configured to, when staggering the target lyrics displayed in the plurality of colors, stagger the target lyrics displayed in the plurality of colors for a plurality of times to form a plurality of sets of staggered target lyrics of a plurality of different colors; and the display module may be configured to, when superimposing the staggered target lyrics on the part of the image data corresponding thereto for display, sequentially superimpose the plurality of sets of staggered target lyrics of the plurality of different colors on the part of the image data corresponding thereto for display.

In some embodiments, the lyric effects display module further includes a video generation module configured to synthesize the processed image data and the music data into a video in response to a video generation operation of a user.

According to one or more embodiments provided in the present disclosure, an electronic device is provided, including: one or more processors; a memory; and one or more application programs stored in the memory and configured to be executed by the one or more processors to execute the method for displaying lyric effects of the above embodiment.

According to one or more embodiments provided in the present disclosure, a computer-readable medium is provided, the medium having at least one instruction, at least one segment program, a code set, or an instruction set stored thereon, and the at least one instruction, the at least one segment program, the code set, or the instruction set is configured to be loaded and executed by a processor to implement the method for displaying lyric effects of the above embodiment.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the above disclosed concept, e.g., technical solutions formed by mutual replacements of the above features and the technical features disclosed in the present disclosure (but not limited to) with similar functions.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in a plurality of embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for displaying lyric effects, comprising:
obtaining image data and music data to be displayed, the music data comprising audio data and lyrics;
determining a target time point, obtaining target lyrics corresponding to the target time point in the lyrics, and obtaining repeated visual representations of all words of the target lyrics in a plurality of colors by performing color separation on all words of the target lyrics in accordance with preset color channels, each of the repeated visual representations corresponding to a respective one of the colors;
spatially staggering the repeated visual representations of all words of the target lyrics in the plurality of colors; and
superimposing the spatially staggered repeated visual representations of all words of the target lyrics in the plurality of colors on a part of the image data corresponding thereto for display, and playing audio data corresponding to the target lyrics.

2. The method according to claim 1, further comprising, prior to obtaining the target lyrics corresponding to the target time point:
composing the target lyrics,
wherein said spatially staggering the repeated visual representations of all words of the target lyrics in the plurality of colors comprises:
spatially staggering the composed target lyrics.

3. The method according to claim 2, wherein composing the target lyrics comprises:
adjusting a number of words displayed in each line of the target lyrics based on a lyric length and a number of sentences of the target lyrics, and adjusting a size of a display font of the target lyrics based on a size of a display interface.

4. The method according to claim 1, wherein said spatially staggering the repeated visual representations of all words of the target lyrics in the plurality of colors comprises:
for one sentence of lyrics within the target lyrics, determining one color channel of the sentence of lyrics as a reference, and moving other color channels of the sentence of lyrics by moving distances that are sinusoidally distributed.

5. The method according to claim 1, further comprising:
obtaining a display duration of the target lyrics;
performing effects processing on the target lyrics within a preset time period in the display duration before the displaying of the target lyrics is finished.

6. The method according to claim 5, wherein said performing effects processing on the target lyrics comprises:
obtaining preset exit effects and a play duration of the exit effects when the display duration of the currently displayed target lyrics reaches a preset duration;
playing the exit effects in accordance with the preset exit effects and the play duration of the exit effects, wherein the playing of the exit effects is controlled to be finished when the displaying of the currently displayed target lyrics is finished.

7. The method according to claim 5, wherein said performing effects processing on the target lyrics comprises:
rotating the target lyrics about a preset rotation axis.

8. The method according to claim 7, wherein rotating the target lyrics about the preset rotation axis comprises:
rotating the target lyrics by a preset angle about the preset rotation axis.

9. The method according to claim 7, further comprising, during said rotating the target lyrics about the preset rotation axis:
adding translational effects to the target lyrics to control the target lyrics to move out of a display interface when the target lyric is rotated about the preset rotation axis.

10. The method according to claim 1, wherein said spatially staggering the repeated visual representations of all words of the target lyrics in the plurality of colors comprises:
spatially staggering the repeated visual representations of all words of the target lyrics in the plurality of colors for a plurality of times to form a plurality of sets of spatially staggered target lyrics of the plurality of colors; and
said superimposing the spatially staggered repeated visual representations of the target lyrics in the plurality of colors on the part of the image data corresponding thereto for display comprises:
sequentially superimposing the plurality of sets of spatially staggered target lyrics of the plurality of colors on the part of the image data corresponding thereto for display.

11. The method according to claim 1, further comprising:
synthesizing, in response to a video generation operation of a user, the image data having the target lyrics superimposed thereon and the music data into a video.

12. An apparatus for displaying lyric effects, comprising:
a data obtaining module configured to obtain image data and music data to be displayed, the music data comprising audio data and lyrics;
a lyric determination module configured to determine a target time point, obtain target lyrics corresponding to the target time point in the lyrics, and obtain repeated visual representations of all words of the target lyrics in a plurality of colors by performing color separation on all words of the target lyrics in accordance with preset color channels, each of the repeated visual representations corresponding to a respective one of the colors;
a staggering module configured to spatially stagger the repeated visual representations of all words of the target lyrics in the plurality of colors; and
a lyric display module configured to superimpose the spatially staggered repeated visual representations of all words of the target lyrics in the plurality of colors on a part of the image data corresponding thereto, for display, and play audio data corresponding to the target lyrics.

13. An electronic device, comprising:
one or more processors;
a memory; and
one or more application programs stored in the memory and configured to be executed by the one or more processors to execute the method for displaying lyric effects according to claim 1.

14. A non-transitory computer-readable medium having at least one instruction, at least one segment program, a code set, or an instruction set stored thereon, wherein the at least one instruction, the at least one segment program, the code set, or the instruction set when loaded and executed by a processor, causes the processor to
obtain image data and music data to be displayed, the music data comprising audio data and lyrics;
determine a target time point, obtaining target lyrics corresponding to the target time point in the lyrics, and obtaining repeated visual representations of all words of the target lyrics in a plurality of colors by performing color separation on all words of the target lyrics in accordance with preset color channels, each of the repeated visual representations corresponding to a respective one of the colors;
spatially stagger the repeated visual representations of all words of the target lyrics in the plurality of colors; and
superimpose the spatially staggered repeated visual representations of all words of the target lyrics in the plurality of colors on a part of the image data corresponding thereto for display, and play audio data corresponding to the target lyrics.

15. The method according to claim 1, wherein said spatially staggering the repeated visual representations of all words of the target lyrics in the plurality of colors comprises:
spatially staggering the repeated visual representations of all words of the target lyrics in the plurality of colors such that at least two of the repeated visual representations of all words of the target lyrics in the plurality of colors partially overlap with each other in space.

16. The method according to claim 1, wherein the preset color channels comprise a plurality of color channels in an RGB color mode.

17. The method according to claim 1, wherein said obtaining repeated visual representations of all words of the target lyrics in the plurality of colors by performing color separation on all words of the target lyrics in accordance with the preset color channels comprises: performing color separation on all words of the target lyrics in accordance with RGB color channels to obtain, respectively, a visual representation of all words of the target lyrics corresponding to the R color channel, a visual representation of all words of the target lyrics corresponding to the G color channel, and a visual representation of all words of the target lyrics corresponding to the B color channel.

18. The method according to claim 4, wherein said for one sentence of lyrics within the target lyrics, determining one color channel of the sentence of lyrics as the reference, and moving other color channels of the sentence of lyrics by moving distances that are sinusoidally distributed comprises: for one sentence of lyrics within the target lyrics, determining a visual representation corresponding to the G color channel of the sentence of lyrics as the reference, and moving a visual representation corresponding to the B color channel and a visual representation corresponding to the R color channel by moving distances that are sinusoidally distributed.

* * * * *